(12) United States Patent
Iwasaki et al.

(10) Patent No.: US 11,796,949 B2
(45) Date of Patent: Oct. 24, 2023

(54) IMAGE FORMING APPARATUS

(71) Applicant: CANON KABUSHIKI KAISHA, Tokyo (JP)

(72) Inventors: Shin Iwasaki, Chiba (JP); Koji Yumoto, Ibaraki (JP); Riki Fukuhara, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/825,119

(22) Filed: May 26, 2022

(65) Prior Publication Data
US 2022/0382202 A1  Dec. 1, 2022

(30) Foreign Application Priority Data
May 28, 2021  (JP) .................................. 2021-089870

(51) Int. Cl.
*G03G 15/00* (2006.01)
(52) U.S. Cl.
CPC ..... *G03G 15/5054* (2013.01); *G03G 15/5041* (2013.01); *G03G 15/5062* (2013.01)
(58) Field of Classification Search
CPC ........... G03G 15/5041; G03G 15/5054; G03G 15/5058; G03G 15/5062; G03G 15/55; G06K 15/027; H04N 1/6033; H04N 1/6055
See application file for complete search history.

(56) References Cited

U.S. PATENT DOCUMENTS

| | | | |
|---|---|---|---|
| 10,306,103 B2* | 5/2019 | Maeda | H04N 1/0032 |
| 2008/0008486 A1* | 1/2008 | Saida | G03G 15/5058 399/49 |
| 2009/0284775 A1* | 11/2009 | Muramatsu | H04N 1/6033 358/1.9 |
| 2011/0135321 A1* | 6/2011 | Ito | G03G 15/5016 399/15 |
| 2011/0222869 A1 | 9/2011 | Sakatani | |
| 2012/0155898 A1* | 6/2012 | Okada | G03G 15/0849 399/53 |
| 2022/0244670 A1 | 8/2022 | Tanaka et al. | |

OTHER PUBLICATIONS

Riki Fukuhara Koji Yumoto Shin Iwasaki, U.S. Appl. No. 17/825,105, filed May 26, 2022.
Koji Yumoto Riki Fukuhara Shin Iwasaki, U.S. Appl. No. 17/827,027, filed May 27, 2022.

* cited by examiner

*Primary Examiner* — Carla J Therrien
(74) *Attorney, Agent, or Firm* — Venable LLP

(57) ABSTRACT

An image forming apparatus includes an image forming unit configured to form an image on a recording medium based on an image forming condition; an image reader configured to read an image for adjustment of the image forming condition, the image for adjustment being formed on the recording medium; and a controller configured to control the image forming unit to form images for adjustment; control the image reader to read the images for adjustment; determine target data based on a reading result of a first image included in reading results of the images for adjustment; and adjust the image forming condition, during execution of a job in which the image forming unit forms a plurality of images on a plurality of recording mediums, based on the target data and a reading result of second image included in the reading results of the images for adjustment.

7 Claims, 9 Drawing Sheets

IMAGE FORMING APPARATUS

BACKGROUND OF THE INVENTION

Field of the Invention

The present disclosure relates to an image forming apparatus, such as a printer, a copying machine, a facsimile machine, or a multifunction apparatus.

Description of the Related Art

An image forming apparatus performs processing for improving stability of image quality, for example, after the end of warm-up at startup. For example, the image forming apparatus forms, as an image for adjustment, a specific pattern such as a tone pattern on a recording medium such as paper, and reads the specific pattern by an image reading apparatus such as a scanner. The image forming apparatus stabilizes the image quality by feeding back information based on the read specific pattern to image forming conditions including a γ correction value. In the image forming apparatus, tone correction is performed by correcting the image forming conditions so that tone characteristics of the image forming apparatus match target tone characteristics.

In United States Patent Application Publication No. 2011/0222869 A1, there is disclosed an image forming apparatus in which a belt-shaped pattern having a specific tone and a predetermined length in a main scanning direction is formed on a recording medium, and a feedback control is performed based on results of reading the belt-shaped pattern at a plurality of positions, to thereby suppress density unevenness in the main scanning direction.

In a case where printing is continuously performed on a plurality of sheets of recording media in one job, it is required to maintain the uniformity of the image densities of respective images formed on the plurality of sheets of recording media. In such a case, for example, the image forming apparatus determines a target tone at the start of a job, and periodically corrects a difference from the target tone during execution of the job. Specifically, the image forming apparatus prints a tone pattern on a recording medium at the start of a job to create a chart for adjustment. The image forming apparatus determines a target tone based on a reading result of the tone pattern printed on the chart for adjustment. The image forming apparatus corrects a change in image density due to changes in the internal state (for example, a change in development characteristics due to toner replenishment and a change in transfer characteristics due to changes in temperature and humidity) caused by continuous printing. To that end, the image forming apparatus creates a chart for adjustment each time printing has been performed on a fixed number of sheets of recording media, and corrects image forming conditions based on a difference between a reading result of the tone pattern read from the chart for adjustment and the target tone. Thus, the image density is corrected, and the image densities of the plurality of sheets of recording media are maintained to be uniform.

However, the reading of the tone pattern may fail due to, for example, misalignment of the tone pattern due to poor conveyance of the recording medium or a failure of the image reading apparatus. In a case where the reading of the tone pattern fails at a stage of determining the target tone at the start of the job, the image forming apparatus cannot determine the target tone. In that case, when the reading of the tone pattern at a printing interval of a fixed number of sheets is successful, the target tone can be determined. However, the fixed number, which corresponds to the printing interval, of sheets of recording media counted from the first sheet are not subjected to image density correction because the target tone has not been determined. Therefore, it is difficult to maintain the image quality of the recording medium during this period. In addition, the reading of the tone pattern may fail during the image density correction which is performed during the job. In this case, when a chart for adjustment is created and read again, productivity decreases. In view of the above-mentioned problems, the present disclosure has an object to provide an image forming apparatus capable of maintaining image quality while suppressing a decrease in productivity.

SUMMARY OF THE INVENTION

An image forming apparatus according to the present disclosure includes an image forming unit configured to form an image on a recording medium based on an image forming condition; an image reader configured to read an image for adjustment of the image forming condition, the image for adjustment being formed on the recording medium; and a controller configured to: control the image forming unit to form images for adjustment; control the image reader to read the images for adjustment; determine target data based on a reading result of a first image included in reading results of the images for adjustment; adjust the image forming condition, during execution of a job in which the image forming unit forms a plurality of images on a plurality of recording mediums, based on the target data and a reading result of a second image included in the reading results of the images for adjustment; control the image forming unit to form the first image again during execution of the job, in a case where the image reader fails to read the first image during execution of the job; and avoid adjusting the image forming condition based on the reading result of the second image during execution of the job, in a case where the image reader fails to read the second image during execution of the job.

Further features of the present invention will become apparent from the following description of exemplary embodiments (with reference to the attached drawings).

DESCRIPTION OF THE EMBODIMENTS

Now, an embodiment of the present disclosure is described in detail with reference to the accompanying drawings.

<Image Processing System>

Figure 1:
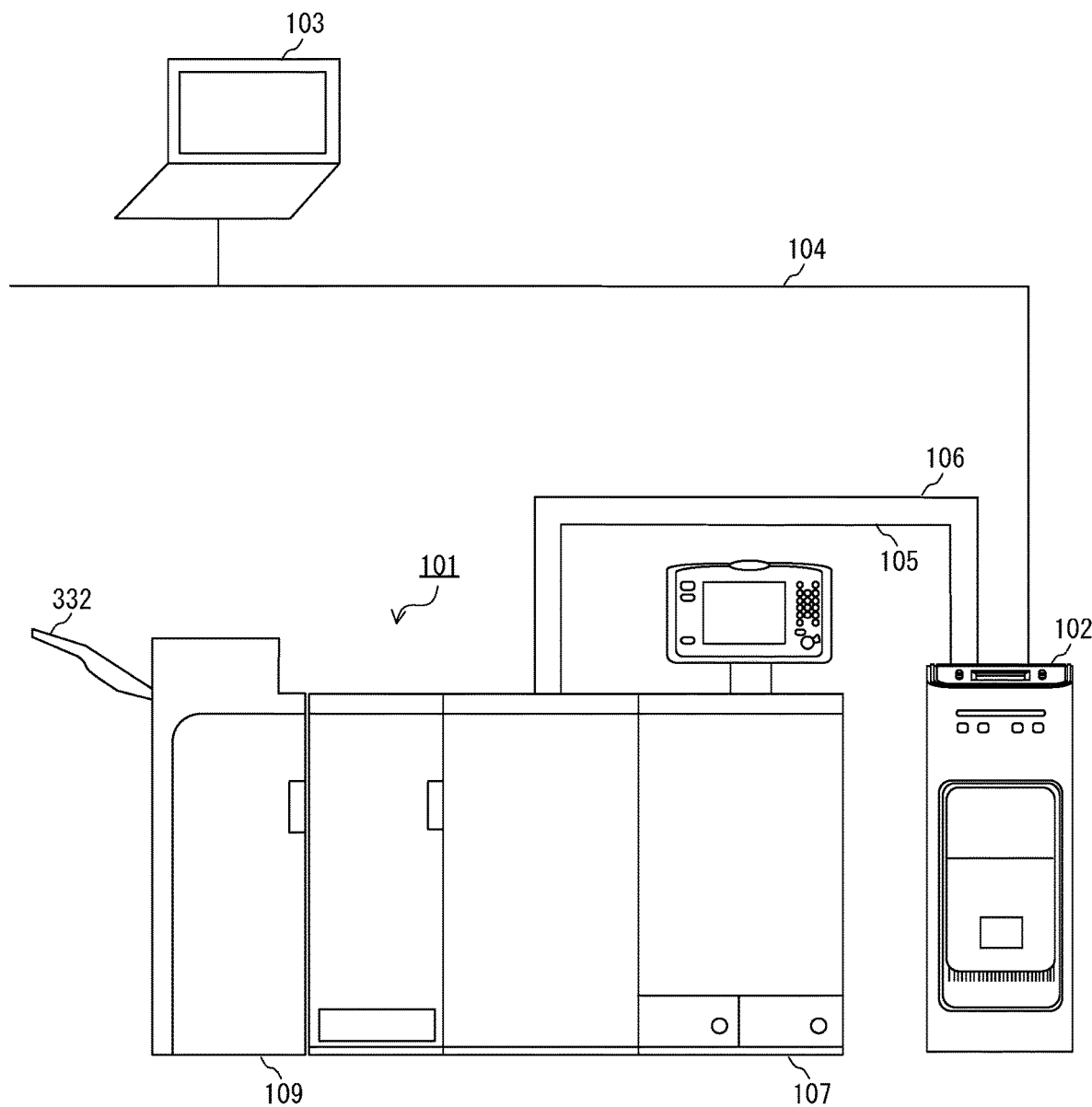
FIG. 1 is a configuration diagram of an image processing system.

FIG. 1 is a configuration diagram of an image processing system including an image forming apparatus according to this embodiment. The image processing system includes an image forming apparatus 101 and an external controller 102. Examples of the image forming apparatus 101 include a multifunction apparatus and a multifunction peripheral (MFP). Examples of the external controller 102 include an image processing controller, a digital front end (DFE), and a print server.

The image forming apparatus 101 and the external controller 102 are connected to each other so as to enable communication therebetween through an internal local area network (LAN) 105 and a video cable 106. The external controller 102 is connected to a client personal computer (PC) 103 through an external LAN 104. The external controller 102 obtains a print instruction (print job) from the client PC 103.

A printer driver having a function of converting an image into a print description language that can be processed by the external controller 102 is installed on the client PC 103. A user can instruct printing through the printer driver by various applications. The printer driver transmits image data to the external controller 102 based on a job instructed from the user. The external controller 102 receives a print job including the image data from the client PC 103, performs data analysis and rasterization processing, and instructs the image forming apparatus 101 to print (to perform image formation) based on the image data.

The image forming apparatus 101 is configured by connecting a plurality of apparatus having different functions including a printing apparatus 107 to one another, and can perform complicated printing processing including bookbinding. The image forming apparatus 101 according to this embodiment includes the printing apparatus 107 and a finisher 109. The printing apparatus 107 forms an image on a recording medium fed from a sheet feeder provided at a lower part of a main body, through use of a developer (for example, toner). The printing apparatus 107 forms yellow (Y), magenta (M), cyan (C), and black (K) images. A full-color image in which the images in the respective colors are superimposed on one another is formed on the recording medium. The recording medium having the image formed thereon is conveyed from the printing apparatus 107 to the finisher 109. The finisher 109 stacks such recording media having images formed thereon onto a stack tray 332.

This image processing system is configured by connecting the external controller 102 to the image forming apparatus 101, but the external controller 102 is not always required. For example, the image forming apparatus 101 may be configured to obtain the print job including the image data directly from the client PC 103 through the external LAN 104. In this case, the image forming apparatus 101 is configured to perform the data analysis and rasterization processing that are supposed to be performed by the external controller 102. That is, the image forming apparatus 101 and the external controller 102 may be integrally configured.

<System Configuration>

Figure 2:
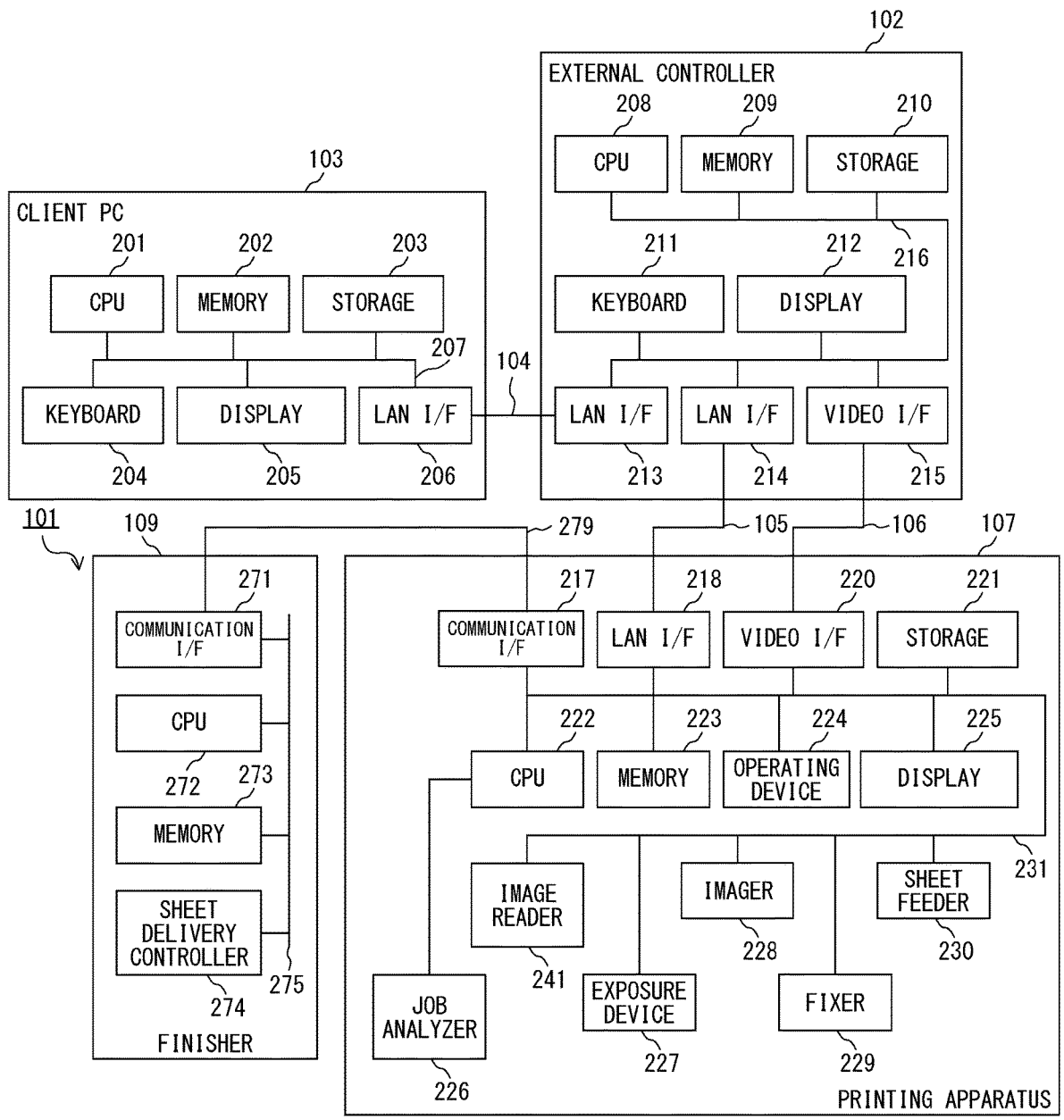
FIG. 2 is a system configuration diagram for illustrating how to control operations of the image processing system.

FIG. 2 is a system configuration diagram for illustrating how to control operations of the image processing system. In this case, a system configuration of each of the image forming apparatus 101, the external controller 102, and the client PC 103 is described.

Printing Apparatus

The printing apparatus 107 includes a communication interface (I/F) 217, a LAN I/F 218, and a video I/F 220 in order to communicate to/from other apparatus. The printing apparatus 107 includes a central processing unit (CPU) 222, a memory 223, a storage 221, an image reader 241, and a job analyzer 226 in order to control operations of the printing apparatus 107. The printing apparatus 107 includes an exposure device 227, an imager 228, a fixer 229, and a sheet feeder 230 in order to form an image. The printing apparatus 107 includes an operating device 224 and a display 225 as user interfaces. Those components are connected to one another through a system bus 231 so as to enable communication to/from one another.

The communication I/F 217 is connected to the finisher 109 through a communication cable 279, and controls communication to/from the finisher 109. In a case where the printing apparatus 107 and the finisher 109 operate in cooperation with each other, information and data are transmitted and received through intermediation of the communication I/F 217. The LAN I/F 218 is connected to the external controller 102 through the internal LAN 105, and controls communication to/from the external controller 102. The printing apparatus 107 receives a print setting and image data from the external controller 102 through intermediation of the LAN I/F 218. The video I/F 220 is connected to the external controller 102 through the video cable 106, and controls communication to/from the external controller 102. The printing apparatus 107 receives image data representing an image to be printed from the external controller 102 through intermediation of the video I/F 220.

The CPU 222 executes computer programs stored in the storage 221 to comprehensively control image processing and image forming processing (printing control). The memory 223 provides a work area for the CPU 222 to execute various kinds of processing. In a case of performing image forming processing, the CPU 222 controls the exposure device 227, the imager 228, the fixer 229, and the sheet feeder 230.

The exposure device 227 includes a photosensitive member, a charging wire which charges the photosensitive member, and a light source which exposes the photosensitive member to light in order to form an electrostatic latent image on the photosensitive member. The photosensitive member is, for example, a photosensitive belt having a photosensitive layer formed on a surface of a belt-like elastic member or a photosensitive drum having a photosensitive layer formed on a surface of a cylinder. In place of the charging wire, a charging roller may be used. The exposure device 227 charges a surface of the photosensitive member to a uniform negative potential through use of the charging wire. The exposure device 227 outputs laser light from the light source based on the image data. The laser light is scanned across the surface of the photosensitive member that has been uniformly charged. Thus, a potential of the photosensitive member changes at a position irradiated with the laser light, and an electrostatic latent image is formed on the surface of the photosensitive member. Four photosensitive members are provided in correspondence with the four colors of yellow (Y), magenta (M), cyan (C), and black (K). Electrostatic latent images corresponding to images in mutually different colors are formed on the four photosensitive members.

The imager 228 transfers a toner image formed on the photosensitive member onto the recording medium. The imager 228 includes a developing device, a transfer unit, and a toner replenisher. The developing device forms a toner image by causing toner charged to a negative polarity to adhere from a developing cylinder to an electrostatic latent image formed on the surface of the photosensitive member. Four developing devices are provided in correspondence with the four colors of yellow (Y), magenta (M), cyan (C), and black (K). The developing device visualizes the electrostatic latent image on the photosensitive member through use of the toner of the corresponding color. In a case where an amount of toner inside the developing device is insufficient due to the formation of the toner image, the developing device is replenished with toner by the toner replenisher.

The transfer unit includes an intermediate transfer belt, and transfers the toner image from each of the photosensitive members onto the intermediate transfer belt. A primary transfer roller is provided at a position opposed to each photosensitive member across the intermediate transfer belt. In a case where a positive potential is applied to each primary transfer roller, the toner images are transferred from the four photosensitive members onto the intermediate transfer belt while being superimposed on one another. Thus, a full-color toner image is formed on the intermediate transfer belt. The toner image formed on the intermediate transfer belt is transferred onto the recording medium by a secondary transfer roller (described later). The secondary transfer roller transfers the full-color toner image from the intermediate transfer belt onto the recording medium in a case where a positive potential is applied to the secondary transfer roller.

The fixer 229 fixes the transferred toner image to the recording medium. The fixer 229 includes a heater and a roller pair. The fixer 229 heats and pressurizes the toner image on the recording medium by the heater and the roller pair to melt the toner image and fix the toner image to the recording medium. Thus, the image is formed on the recording medium. The sheet feeder 230 includes a conveyance roller and various sensors in a conveyance path, and controls a feeding operation of the recording medium.

The image reader 241 reads the image formed on the conveyed recording medium based on an instruction received from the CPU 222. For example, in a case of adjusting image forming conditions, the CPU 222 causes the image reader 241 to read images for adjustment of the image forming conditions, which are formed on the recording medium. The job analyzer 226 analyzes setting information on the image forming apparatus 101 and print data received from the external controller 102. The operating device 224 is an input device which receives input of various settings and operation instructions from the user. Examples of the operating device 224 include various input keys and a touch panel. The display 225 is an output device which displays the setting information on the image forming apparatus 101 and a processing status (status information) of the print job.

Finisher

The finisher 109 is, for example, a large-capacity stacker. The finisher 109 includes a communication I/F 271, a CPU 272, a memory 273, and a sheet delivery controller 274. Those components are connected to one another through a system bus 275 so as to enable communication to/from one another. The communication I/F 271 is connected to the printing apparatus 107 through the communication cable 279, and controls communication to/from the printing apparatus 107. In a case where the finisher 109 and the printing apparatus 107 operate in cooperation with each other, information and data are transmitted and received through intermediation of the communication I/F 271. The CPU 272 executes control programs stored in the memory 273 to perform various kinds of control required for sheet delivery. The memory 273 stores the control programs. The memory 273 provides a work area for the CPU 272 to execute various types of processing. The sheet delivery controller 274 delivers the conveyed recording medium onto the stack tray 332 based on an instruction received from the CPU 272.

External Controller

The external controller 102 includes a LAN I/F 213, a LAN I/F 214, and a video I/F 215 in order to communicate to/from other apparatus. The external controller 102 includes a CPU 208, a memory 209, and a storage 210 in order to control the operation of the external controller 102. The external controller 102 includes a keyboard 211 and a display 212 as user interfaces. Those components are connected to one another through a system bus 216 so as to enable communication to/from one another.

The LAN I/F 213 is connected to the client PC 103 through the external LAN 104, and controls communication to/from the client PC 103. The external controller 102 obtains the print job from the client PC 103 through intermediation of the LAN I/F 213. The LAN I/F 214 is connected to the printing apparatus 107 through the internal LAN 105, and controls communication to/from the printing apparatus 107. The external controller 102 transmits, for example, the print setting and the image data to the printing apparatus 107 through intermediation of the LAN I/F 214. The video I/F 215 is connected to the printing apparatus 107 through the video cable 106, and controls communication to/from the printing apparatus 107. The external controller 102 transmits the image data to the printing apparatus 107 through intermediation of the video I/F 215.

The CPU 208 executes computer programs stored in the storage 210 to comprehensively perform processing, such as reception of the image data transmitted from the client PC 103, RIP processing, and transmission of the image data to the image forming apparatus 101. The memory 209 provides a work area for the CPU 208 to execute various kinds of processing. The keyboard 211 is an input device which receives input of various settings and operation instructions from the user. The display 212 is an output device which displays information on an execution application of the external controller 102 as a still image or a moving image.

Client PC

The client PC 103 includes a CPU 201, a memory 202, a storage 203, a keyboard 204, a display 205, and a LAN I/F 206. Those components are connected to one another through a system bus 207 so as to enable communication to/from one another.

The CPU 201 executes computer programs stored in the storage 203 to control the operation of the client PC 103. In this embodiment, the CPU 201 creates image data and transmits a print job. The memory 202 provides a work area for the CPU 201 to execute various kinds of processing. The keyboard 204 and the display 205 are user interfaces. The keyboard 204 is an input device which receives instructions from the user. The display 205 is an output device which displays information on an execution application of the client PC 103 as a still image or a moving image. The LAN I/F 206 is connected to the external controller 102 through the external LAN 104, and controls communication to/from the external controller 102. The client PC 103 transmits the print job to the external controller 102 through the LAN I/F 206.

The external controller 102 and the image forming apparatus 101 are connected through the internal LAN 105 and the video cable 106, but may be connected, for example, only through a video cable as long as data required for printing can be transmitted and received therebetween. It suffices that each of the memory 202, the memory 209, the memory 223, and the memory 273 is a storage device for holding data and programs. As those memories, it is possible to use, for example, a volatile random access memory (RAM), a non-volatile read only memory (ROM), a storage, and a universal serial bus (USB) memory.

<Configuration of Image Forming Apparatus>

Figure 3:
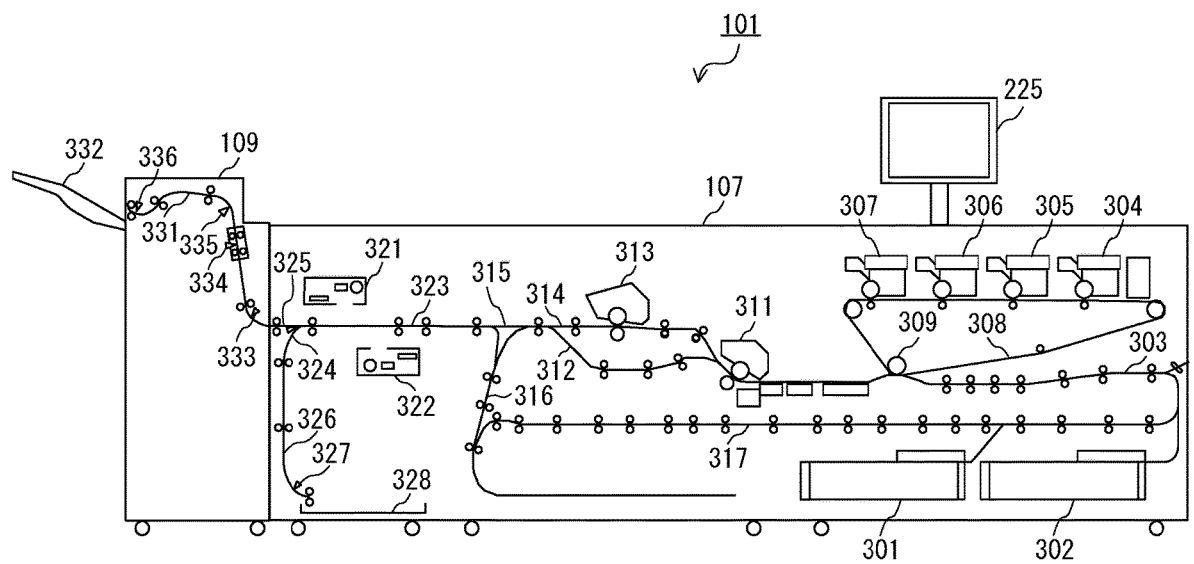
FIG. 3 is a configuration diagram of an image forming apparatus.

FIG. 3 is a configuration diagram of the image forming apparatus 101. The display 225 is provided at an upper part of a casing of the printing apparatus 107. The display 225 displays information for a printing status and settings of the image forming apparatus 101. The recording medium having the image formed thereon by the printing apparatus 107 is conveyed to the finisher 109 provided in the subsequent stage.

The printing apparatus 107 includes, as the sheet feeder 230, a plurality of sheet feeding decks 301 and 302, conveyance paths 303, 312, 314, 315, and 323, a reverse path 316, a double-sided conveyance path 317, a downstream conveyance path 325, a delivery path 326, and various rollers. Mutually different types of recording media can be stored in the sheet feeding decks 301 and 302. Of the recording media stored in the sheet feeding decks 301 and 302, an uppermost sheet is separated and fed to the conveyance path 303. The printing apparatus 107 includes, as the exposure device 227, image forming units 304, 305, 306, and 307 for forming an image. The printing apparatus 107 forms a color image. To that end, the image forming unit 304 forms a black (K) image (toner image). The image forming unit 305 forms a cyan (C) image (toner image). The image forming unit 306 forms a magenta (M) image (toner image). The image forming unit 307 forms a yellow (Y) image (toner image).

The printing apparatus 107 includes, as the imager 228, a secondary transfer roller 309 and an intermediate transfer belt 308 onto which the toner images are to be transferred from the image forming units 304, 305, 306, and 307. The intermediate transfer belt 308 is rotated clockwise in FIG. 3, and the toner images are superimposed on one another and transferred in the order of the image forming unit 307, the image forming unit 306, the image forming unit 305, and the image forming unit 304 (primary transfer). Thus, a full-color toner image is formed on the intermediate transfer belt 308. The intermediate transfer belt 308 is rotated, to thereby carry the toner image to the secondary transfer roller 309. The recording medium is conveyed to the conveyance path 303 at a timing at which the toner image is carried to the secondary transfer roller 309. The secondary transfer roller 309 transfers the toner image on the intermediate transfer belt 308 onto the conveyed recording medium (secondary transfer).

The printing apparatus 107 includes, as the fixer 229, a first fixing device 311 and a second fixing device 313. The first fixing device 311 and the second fixing device 313 have the same configuration, and each fix the toner image to the recording medium. To that end, the first fixing device 311 and the second fixing device 313 each include a pressure roller and a heating roller. The recording medium is heated and pressurized by passing between the pressure roller and the heating roller to have the toner image melted and press-fixed. The recording medium that has passed through the second fixing device 313 is conveyed to the conveyance path 314. The second fixing device 313 is arranged downstream of the first fixing device 311 in a conveying direction of the recording medium, and is used for adding a gloss to the image on the recording medium, which has been subjected to fixing processing by the first fixing device 311, and for ensuring fixability. For that reason, the second fixing device 313 may not be used depending on the type of recording medium and the content of the print job. The conveyance path 312 is provided in order to convey the recording medium subjected to the fixing processing by the first fixing device 311 without passing the recording medium through the second fixing device 313.

At a position after the conveyance path 314 and the conveyance path 312 merge, the conveyance path 315 and the reverse path 316 are provided. In a case where duplex printing is instructed, the recording medium is conveyed to the reverse path 316. The recording medium conveyed to the reverse path 316 is reversed in the reverse path 316 in terms of the conveying direction, and conveyed to the double-sided conveyance path 317. A surface (first surface) of the recording medium on which an image has been formed is reversed by the reverse path 316 and the double-sided conveyance path 317. The recording medium is conveyed to the conveyance path 303 by the double-sided conveyance path 317, and passes through the secondary transfer roller 309 and the fixer 229, to thereby have an image formed on a second surface of the recording medium.

In a case of single-sided printing or in a case where images are formed on both sides by duplex printing, the recording medium is conveyed to the conveyance path 315. The conveyance path 323 is arranged downstream of the conveyance path 315 in the conveying direction of the recording medium.

Figure 4:
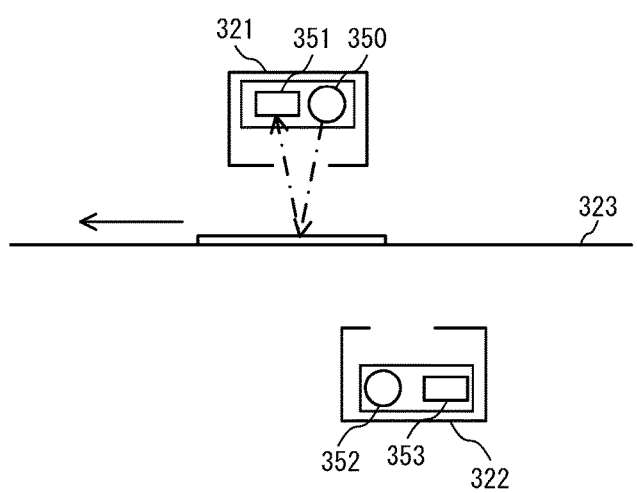
FIG. 4 is an explanatory view of CISs.

As the image reader 241, contact image sensors (CISs) 321 and 322 are arranged in the conveyance path 323 so as to be opposed to each other across the conveyance path 323. FIG. 4 is an explanatory view of the CISs 321 and 322. The CIS 321 is an optical sensor which reads an image on an upper surface of the recording medium being conveyed along the conveyance path 323. The CIS 322 is an optical sensor which reads an image on a lower surface of the recording medium being conveyed along the conveyance path 323.

The CIS 321 includes a light emitting diode (LED) 350 serving as a light source and a reading sensor 351 serving as a light receiver. The LED 350 irradiates the upper surface of the recording medium with light at a timing at which the recording medium conveyed along the conveyance path 323 reaches a reading position. The reading sensor 351 includes a plurality of light-receiving elements (photoelectric conversion elements) in a direction perpendicular to the conveying direction of the recording medium. Therefore, the direction perpendicular to the conveying direction of the recording medium is a main scanning direction of the CIS 321. The reading sensor 351 receives the light reflected by the recording medium through the light-receiving elements. The plurality of light-receiving elements of the reading sensor 351 each output an output value (electric signal) based on intensity of the reflected light that has been received. Each output value (electric signal) output from the plurality of light-receiving elements is transmitted to the CPU 222. In this manner, an image formed on the recording medium is read.

The CIS 322 includes an LED 352 and a reading sensor 353 having the same configurations as those of the CIS 321. The CIS 322 operates in the same manner as the CIS 321 to read an image formed on the lower surface of the recording medium at a timing at which the recording medium conveyed along the conveyance path 323 reaches a reading position. In addition to the CISs 321 and 322, the image reader 241 can also be implemented by a CCD or CMOS sensor.

The printing apparatus 107 in this embodiment can form images for adjustment for adjusting the image forming conditions on both sides of the recording medium. A recording medium having the images for adjustment formed thereon is referred to as "chart for adjustment." The printing apparatus 107 prints the images for adjustment on a recording medium to create a chart for adjustment, and causes the CIS 321 and the CIS 322 to read the images for adjustment. Results of reading the chart for adjustment by the CIS 321 and the CIS 322 are stored in the memory 223. The CPU 222 refers to the memory 223 to analyze the results of reading the chart for adjustment by the CIS 321 and the CIS 322, and feeds back the analyzed results to adjust the image forming conditions.

For example, in a case where the in-machine temperature of the printing apparatus 107 rises, the image density of the image formed on the recording medium varies more greatly than when the in-machine temperature of the printing apparatus 107 is lower. The printing apparatus 107 creates a chart for adjustment, and detects the image density of the image for adjustment based on the reading results obtained by the CISs 321 and 322. The CPU 222 obtains a variation amount of the detected image density with respect to a target image density, and adjusts the image forming conditions based on the variation amount. The CPU 222 converts the image data based on the image forming conditions. The printing apparatus 107 forms an image on the recording medium based on the image data converted by the CPU 222, to thereby control the image density of the image formed on the recording medium. Thus, the printing apparatus 107 can suppress variations in the image density of the image caused by variations in the in-machine temperature.

For example, the printing apparatus 107 controls light emission intensity of the light source of the exposure device 227 based on the adjusted image forming conditions, to thereby adjust the image density to the target image density. In another case, the CPU 222 generates a one-dimensional tone correction table for suppressing the variations in the image density based on the reading result obtained by the CIS 321 (or the CIS 322). The CPU 222 converts the image data based on the tone correction table. The printing apparatus 107 forms an image on the recording medium based on the image data converted by the CPU 222, to thereby adjust the image density of the printing apparatus 107 to an ideal image density.

The image for adjustment to be formed on the chart for adjustment may be not only an image for detecting an image density but also an image for detecting geometric characteristics of an image or an image for detecting color misregistration. The geometric characteristics of the image refer to, for example, squareness and a printing position of the image on the recording medium. In a case where the image for adjustment for detecting the geometric characteristics of the image is formed, the CPU 222 adjusts the image forming conditions in order to suppress variations in the geometric characteristics based on the reading results obtained by the CIS 321 (or CIS 322). The CPU 222 controls, for example, a light emission timing of the light source of the exposure device 227 based on the image forming conditions, to thereby adjust the geometric characteristics of the image to ideal geometric characteristics.

Further, in a case where an image for adjustment for detecting the color misregistration is formed, the CPU 222 detects the color misregistration based on the reading results obtained by the CIS 321 (or the CIS 322). The CPU 222 adjusts the image forming conditions based on the detected color misregistration in order to suppress the color misregistration. The CPU 222 controls, based on the image forming conditions, a position of an image to be formed on each photosensitive member by the exposure device 227, to thereby correct the color misregistration.

The chart for adjustment is excluded so as to avoid being mixed in printed products corresponding to the print job. To that end, the printing apparatus 107 includes a flapper 324, the delivery path 326, a conveyance sensor 327, and a delivery tray 328. The chart for adjustment which has the image for adjustment read by the CISs 321 and 322 is conveyed to the delivery path 326 by the flapper 324. The recording medium conveyed to the delivery path 326 is delivered to the delivery tray 328.

In a case where the recording medium is not a chart for adjustment, the recording medium is conveyed from the conveyance path 323 to a downstream conveyance path 325 by the flapper 324. A recording medium conveyed to the downstream conveyance path 325 is passed over to the finisher 109. In a case where the printing apparatus 107 obtains a notification of occurrence of a conveyance jam from the finisher 109, irrespective of whether or not the recording medium is a chart for adjustment, the printing apparatus 107 switches the flapper 324 toward the delivery path 326 to deliver all the recording media in the machine (residual sheets) to the delivery tray 328. The delivery of the residual sheets to the delivery tray 328 reduces a load on the user in jam clearance.

The finisher 109 can stack the recording media passed over from the printing apparatus 107. The finisher 109 includes a conveyance path 331 and the stack tray 332 for stacking the recording media. The conveyance path 331 is provided with conveyance sensors 333, 334, 335, and 336. The recording media conveyed from the printing apparatus 107 are stacked on the stack tray 332 through the conveyance path 331. The conveyance sensors 333, 334, 335, and 336 each detect passage of the recording medium being conveyed along the conveyance path 331. In a case where a leading edge or a trailing edge of the recording medium in the conveying direction is not detected by the conveyance sensors 333, 334, 335, and 336 even after a lapse of a predetermined time period since start of the conveyance of the recording medium, the CPU 272 determines that a conveyance jam (conveyance abnormality) has occurred in the finisher 109. In this case, the CPU 272 notifies the printing apparatus 107 that a conveyance jam has occurred.

<Images for Adjustment>

Figure 5:
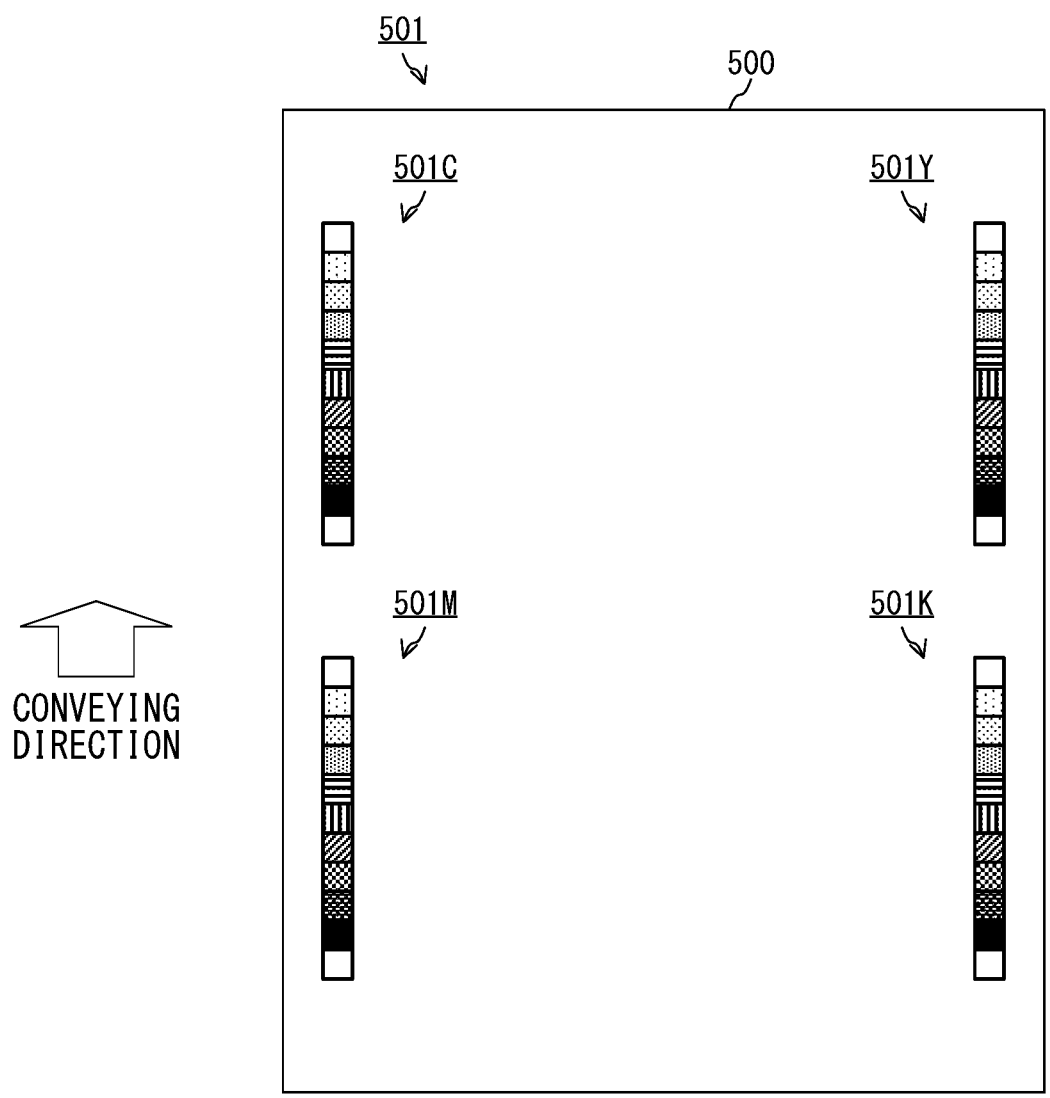
FIG. 5 is an exemplary view of a chart for adjustment.

FIG. 5 is an exemplary view of the chart for adjustment. This chart 500 for adjustment is conveyed in a longitudinal direction of the chart 500 for adjustment. Patterns 501 for adjustment are images for adjustment for image density correction, and are formed on one surface of the recording medium for respective colors. The patterns 501 for adjustment may be formed at any positions in a peripheral edge portion of the recording medium. In this embodiment, the patterns 501 for adjustment are formed in both end portions of the recording medium in a direction (short-side direction of the recording medium) perpendicular to the conveying direction of the recording medium. That is, the patterns 501 for adjustment of two colors are formed in one end portion of the recording medium in the short-side direction, and the patterns 501 for adjustment of the remaining two colors are formed in the other end portion of the recording medium in the short-side direction. In this embodiment, patterns 501C and 501M for adjustment of cyan and magenta are formed in one end portion of the recording medium in the short-side direction, and patterns 501Y and 501K for adjustment of yellow and black are formed in the other end portion of the recording medium in the short-side direction. Thus, the patterns 501 for adjustment are not formed in a leading edge portion of the recording medium in the conveying direction, and it is possible to more reliably suppress occurrence of winding of the recording medium during the fixing processing.

The patterns 501 for adjustment are each formed of a plurality of tone patches (11 tones in FIG. 5) in which a tone value of each color is varied stepwise. The plurality of tone patches are each, for example, a square shape having a side of about 8 mm, and are arranged in a row in the conveying direction. In the tone patches of each color, a tone patch for detecting a texture of the recording medium (that is, a tone patch having a tone value of 0) is located at each of both ends of a row of the other tone patches. Nine tone patches having evenly distributed tone values are arranged so as to be sandwiched between the tone patches having a tone value of 0. In a case where the tone value is represented by a range of from 0 to 255, the patterns 501 for adjustment are each formed of the tone patches of each color having tone values of 0, 16, 32, 64, 86, 104, 128, 176, 224, 255, and 0. The patterns 501 for adjustment are not limited to yellow, magenta, cyan, and black, and may be formed of respective colors of red, green, and blue and process black. The size and the tone order are not limited as well.

<Correction of Image Density>

Figure 6:
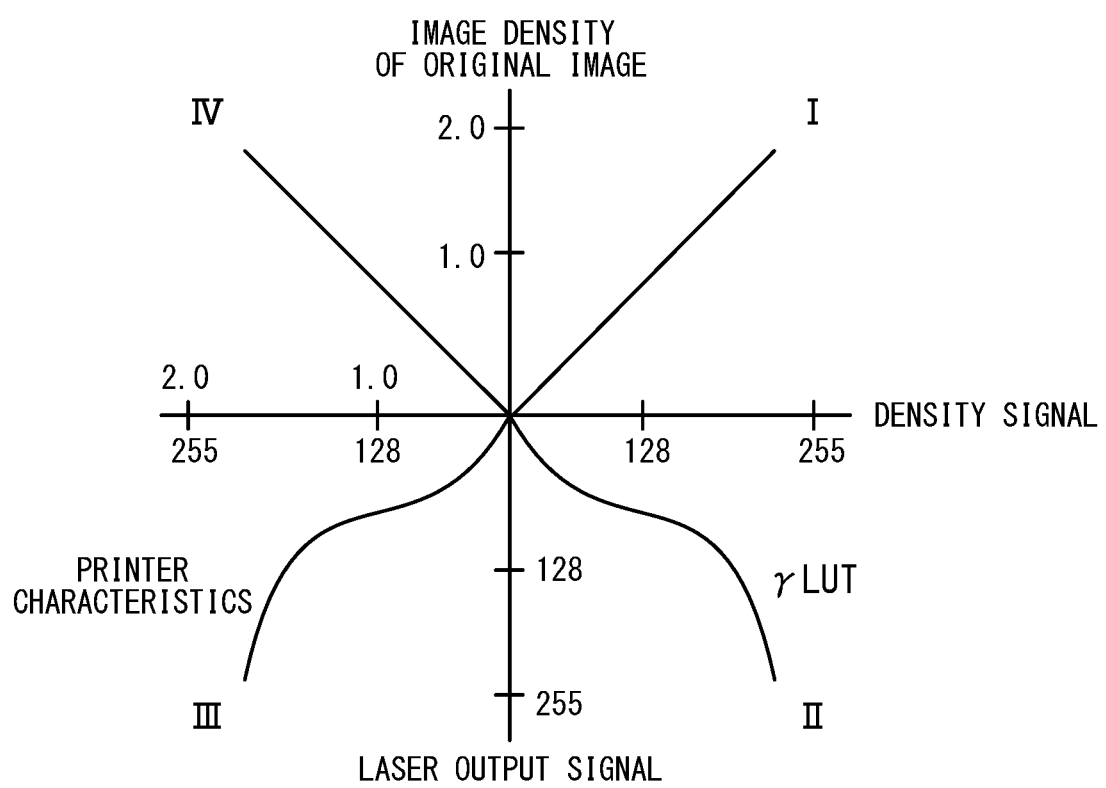
FIG. 6 is a four-quadrant chart for showing how a tone is reproduced.

FIG. 6 is a four-quadrant chart for showing how the tones are reproduced. Quadrant I represents a relationship between the density of an image (original image) to be printed and an input value of image data (density signal) indicating the image. Quadrant II represents a conversion condition (γLUT) for converting the density signal into a laser output signal indicating an amount of laser light output from the exposure device 227. Quadrant III represents tone characteristics (printer characteristics) of the printing apparatus 107 indicating a relationship between the laser output signal and the density (image density) of the image formed on the recording medium. Quadrant IV indicates a relationship between the density of the original image and the density (image density) of the image formed on the recording medium. That is, the four-quadrant chart represents total tone reproduction characteristics of the printing apparatus 107 illustrated in FIG. 1.

The printing apparatus 107 generates a conversion condition (γLUT) in quadrant II so that the density of the original image and the image density have an ideal relationship (linear relationship). Thus, in a case where a γLUT is generated based on the reading results obtained by the reading sensors 351 and 353, the CPU 222 obtains tone characteristics from the reading results of the patterns 501 for adjustment, and generates a γLUT so that the tone characteristics become ideal tone characteristics. An image signal having the tone characteristics converted by the γLUT is converted into a pulse signal corresponding to a dot width by a pulse width modulation (PWM) circuit of a laser driver, and is transmitted to the laser driver for driving and controlling the exposure device 227. In this embodiment, a tone reproduction method based on pulse width modulation is used for all the colors of yellow, magenta, cyan, and black.

The laser light output from the exposure device 227 is scanned, to thereby form, on the photosensitive drum, an electrostatic latent image having the tones controlled by changing the dot area to have predetermined tone characteristics. This electrostatic latent image is developed into a toner image, and the toner image is transferred onto a recording medium and fixed to the recording medium, to thereby reproduce a tone image.

<Method of Setting Automatic Adjustment>

The image forming apparatus 101 according to this embodiment is capable of setting automatic adjustment for automatically adjusting the image forming conditions during printing. FIG. 7A to FIG. 7D are explanatory views of a setting screen for setting the automatic adjustment. The setting screen is displayed on the display 225 by the CPU 222. The user can set the automatic adjustment from the setting screen through the operating device 224. The user sets the automatic adjustment before instructing execution of printing.

Figure 7A:
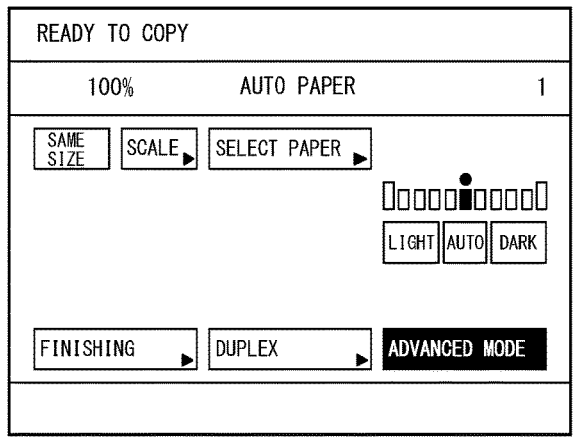
FIG. 7A, FIG. 7B, FIG. 7C, and FIG. 7D are exemplary views of a setting screen.
Figure 7B:
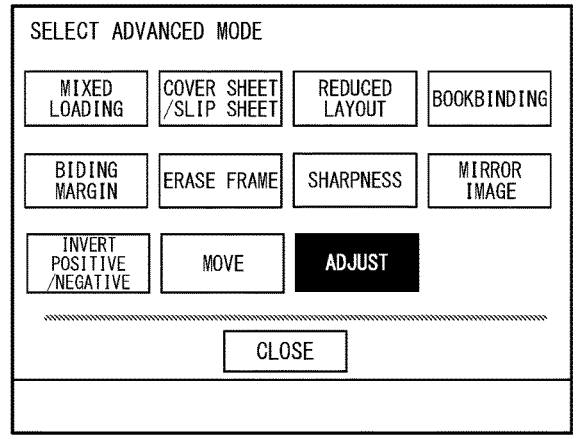
Figure 7C:
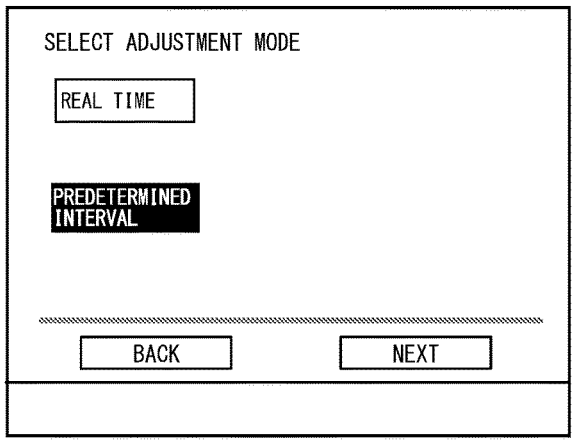

FIG. 7A is an illustration of an initial screen. In a case where the user selects a soft key labeled "ADVANCED MODE" from the initial screen, the CPU 222 displays an advanced mode selection screen of FIG. 7B on the display 225. In a case where the user selects a soft key labeled "CLOSE" from the advanced mode selection screen, the CPU 222 displays the initial screen of FIG. 7A on the display 225. In a case where the user selects a soft key labeled "ADJUST" from the advanced mode selection screen, the CPU 222 displays an adjustment mode selection screen of FIG. 7C on the display 225.

In a case where the user selects a soft key labeled "REAL TIME" from the adjustment mode selection screen, a real-time mode for adjusting image forming conditions in real time is set. In the real-time mode, the patterns 501 for adjustment are formed in a margin area of the recording medium on which an image corresponding to a job has been printed. Thus, the image forming conditions are adjusted every time an image is formed in accordance with a job. The CPU 222 notifies the external controller 102 that the real-time mode has been set. In a case where a job is started, the external controller 102 instructs the CPU 222 to print the patterns 501 for adjustment in the real-time mode. In a case where the user selects a soft key labeled "BACK" from the adjustment mode selection screen, the CPU 222 displays the advanced mode selection screen of FIG. 7B on the display 225.

Figure 7D:
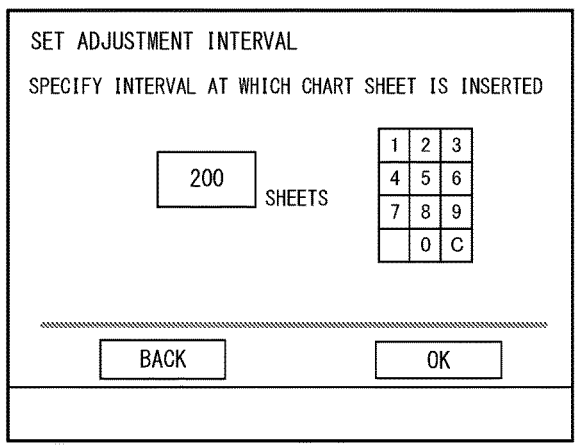

In a case where the user selects a soft key labeled "PREDETERMINED INTERVAL" from the adjustment mode selection screen, the CPU 222 displays an adjustment interval setting screen of FIG. 7D on the display 225. In a case where the user presses a soft key labeled "OK" after inputting the number of sheets by a numeric keypad on the adjustment interval setting screen, automatic adjustment is enabled. Thus, a predetermined-interval mode and the number of sheets of an adjustment interval are set. In the example of FIG. 7D, 200 sheets are set as the number of sheets of the adjustment interval. A chart for adjustment is created every time an image is formed on the number of sheets of recording media set as the adjustment interval. That is, the automatic adjustment is performed for every number of sheets set as the adjustment interval, to thereby adjust the image forming conditions. The CPU 222 notifies the external controller 102 that the predetermined-interval mode and the number of sheets of the adjustment interval have been set. In a case where a job is started, the external controller 102 instructs the CPU 222 to print the patterns 501 for adjustment on the number of sheets of the adjustment interval. In a case where the user selects a soft key labeled "BACK" from the adjustment interval setting screen, the CPU 222 displays the adjustment mode selection screen of FIG. 7C on the display 225.

For example, in a case in which the number of sheets of the adjustment interval is set to 200, in a case where the printing on 1,000 sheets of recording media is instructed by a print job, a chart for adjustment is created at a printing interval of 200 sheets in the predetermined-interval mode. In this case, a chart for adjustment is created between the 200th page and the 201st page, between the 400th page and the 401st page, between the 600th page and the 601st page, and between the 800th page and the 801st page. That is, the image density is corrected between the 200th page and the 201st page, between the 400th page and the 401st page, between the 600th page and the 601st page, and between the 800th page and the 801st page, to thereby adjust the image forming conditions.

<Printing Processing>

Figure 8:
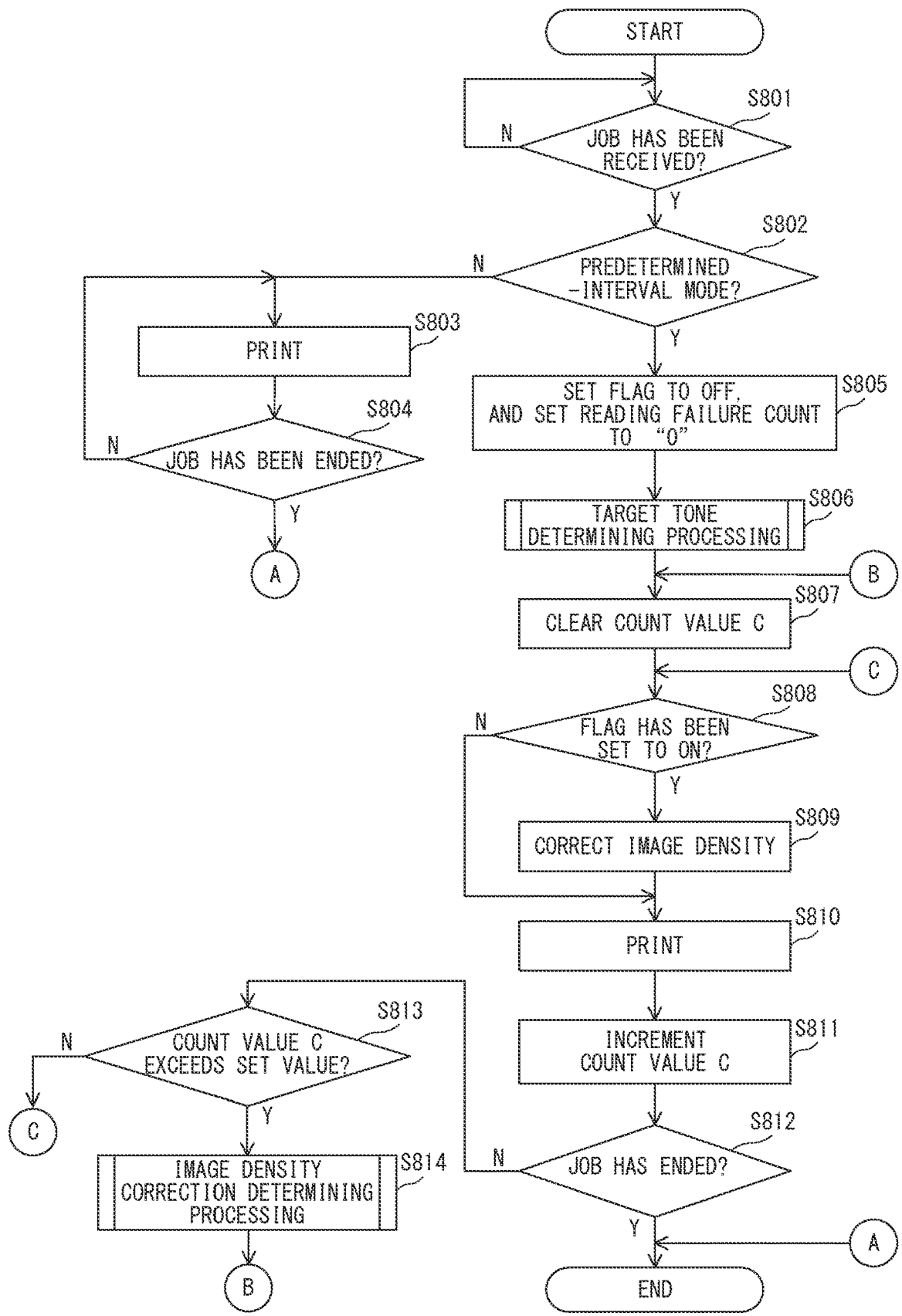
FIG. 8 is a flow chart for illustrating printing processing including correction processing for an image density.
Figure 9:
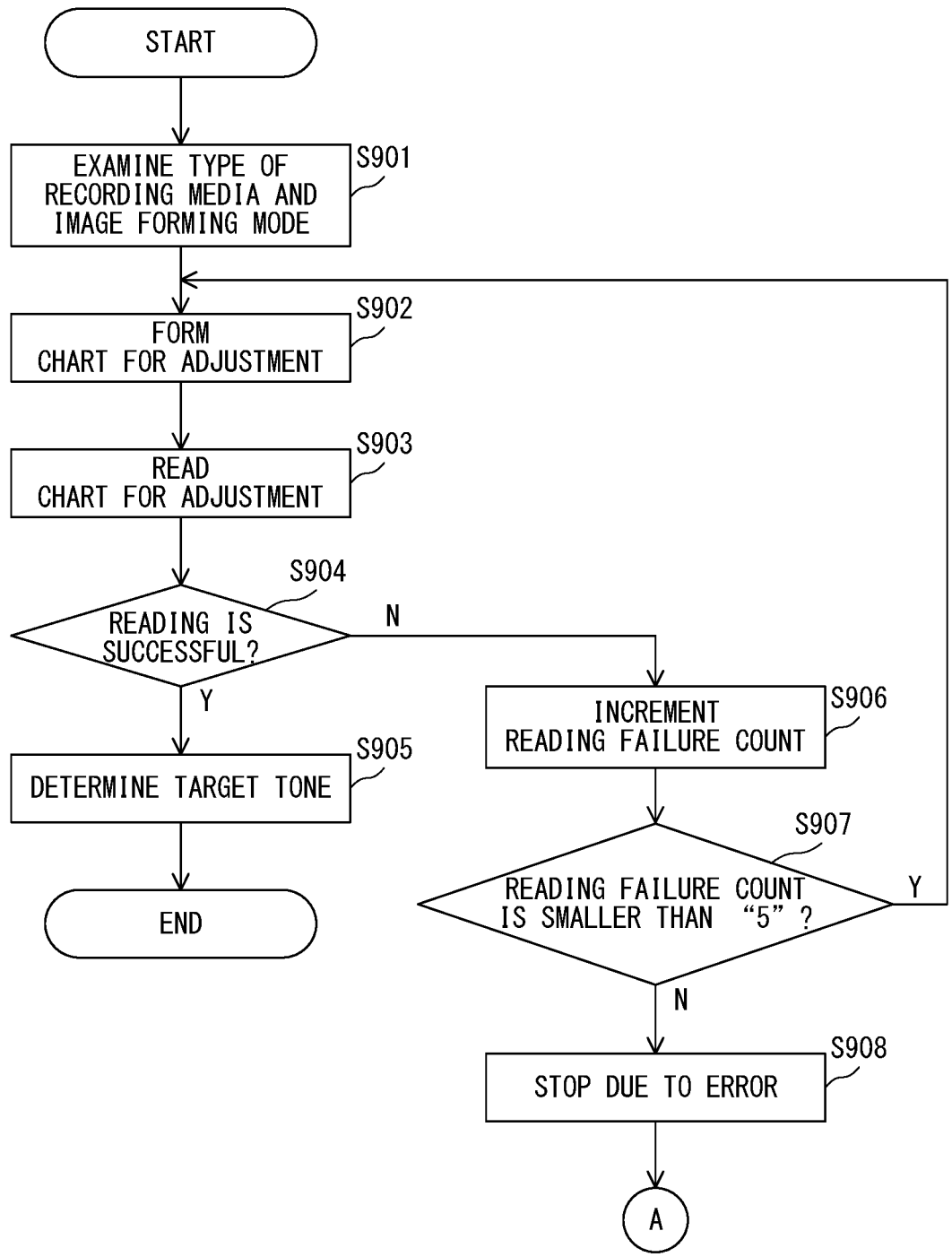
FIG. 9 is a flow chart for illustrating the printing processing including the correction processing for the image density.
Figure 10:
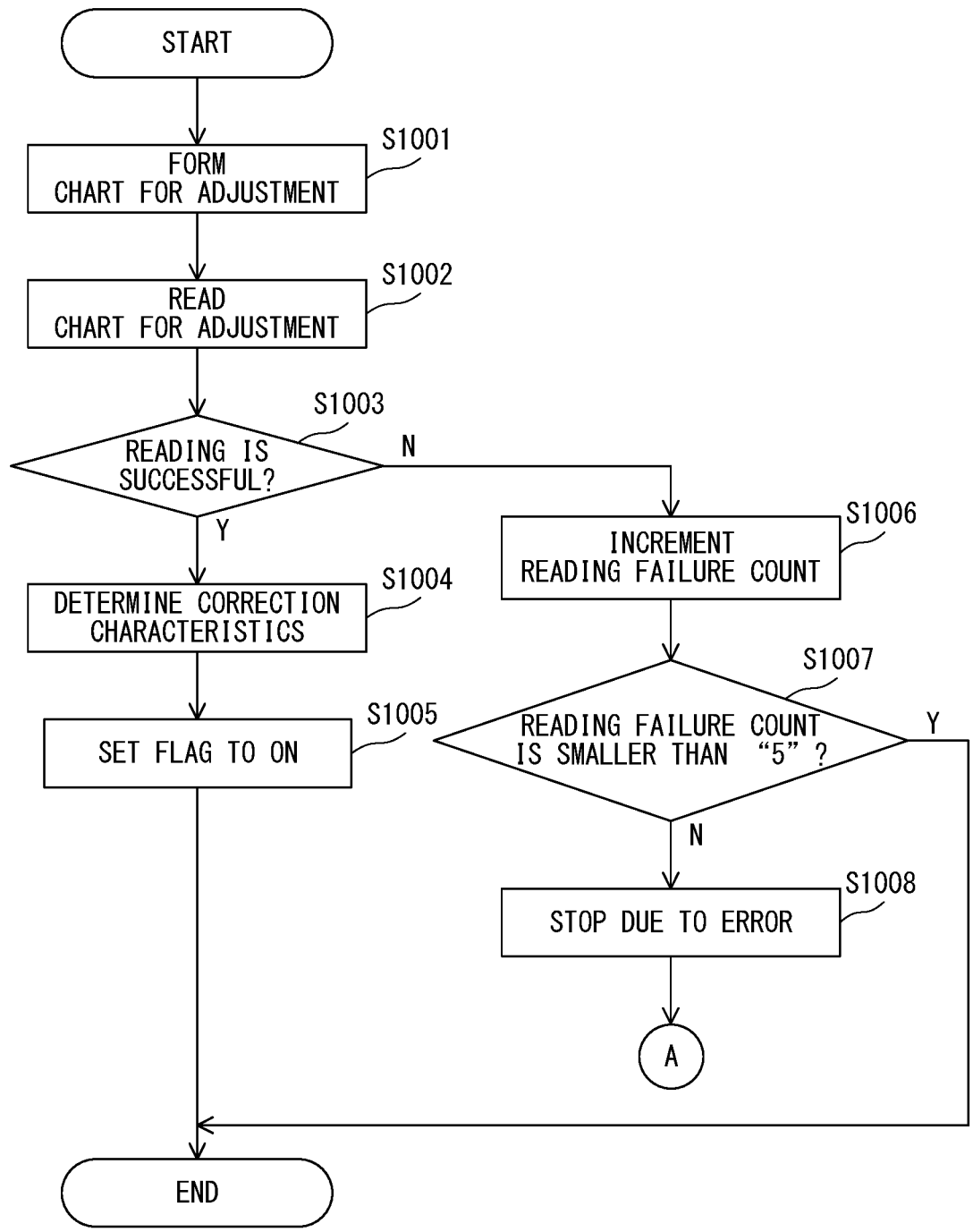
FIG. 10 is a flow chart for illustrating the printing processing including the correction processing for the image density.

FIG. 8, FIG. 9, and FIG. 10 are flow charts for illustrating printing processing including correction processing for the image density, which is performed by the image forming apparatus 101 having the above-mentioned configuration. In this embodiment, in a case where the CPU 222 of the printing apparatus 107 obtains a printing instruction from the external controller 102, the CPU 222 determines the γLUT as a target tone serving as a target value. The CPU 222 forms an image through use of the determined γLUT. Each time the printing on a predetermined number of sheets of recording media is ended during execution of a print job, the CPU 222 performs image density correction, and corrects a difference from the target value (target tone) to update the γLUT.

The CPU 222 stands by until the CPU 222 receives a print job from the external controller 102 ("N" in Step S801). In a case where the CPU 222 receives the print job ("Y" in Step S801), the CPU 222 determines whether or not the predetermined-interval mode is set on the setting screens exemplified in FIG. 7A to FIG. 7D (Step S802). In a case where the predetermined-interval mode is not set ("N" in Step S802), the CPU 222 prints an image specified by the print job on the recording medium (Step S803). After the printing, the CPU 222 determines whether or not all the printing processes instructed by the print job have ended (Step S804). In a case where not all the printing processes have ended ("N" in Step S804), the CPU 222 repeatedly performs the printing processing until all the printing processes instructed by the print job have ended. In a case where all the printing processes have ended ("Y" in Step S804), the CPU 222 ends the processing.

In a case where the predetermined-interval mode is set ("Y" in Step S802), the CPU 222 sets an image density correction flag to OFF, and sets a reading failure count to "0" (Step S805). The image density correction flag is a flag to be set to ON in a case where the image density correction is determined to be executed by image density correction determining processing, which is described later. The reading failure count is "0" at the start of a print job. The reading failure count represents the number of times that the reading of a chart for adjustment has failed during the print job. In a case where the reading failure count reaches a predetermined number or more, in this embodiment, "5" or more, the CPU 222 determines that an error has occurred because there is a possibility that a failure has occurred in the CIS 321 or the CIS 322. The failure in reading the chart for adjustment is determined based on, for example, a reading result or a detection result obtained by a sensor for detecting the conveyance of the chart for adjustment. The CPU 222 determines that the reading of the chart for adjustment has failed in a case where the reading result of the chart for adjustment includes an abnormal value. The CPU 222 determines that the reading of the chart for adjustment has failed in a case where a detection timing of the sensor for detecting the conveyance of the chart for adjustment is later or earlier than predicted.

Subsequently, the CPU 222 executes target tone determining processing, which is described later (Step S806). After the end of the target tone determining processing, the CPU 222 sets a count value C of an execution interval of the image density correction to "0" (that is, clears the count value C) (Step S807). The CPU 222 determines whether or not the image density correction flag is set to ON (Step S808). In a case where the image density correction flag is set to ON ("Y" in Step S808), the CPU 222 corrects the image density based on the correction characteristics of the image density (Step S809). After the image density correction, the CPU 222 prints the image specified by the print job on the recording medium (Step S803). In a case where the image density correction flag is set to OFF ("N" in Step S808), the CPU 222 prints the image specified by the print job on the recording medium without performing the image density correction (Step S803).

After the printing processing, the CPU 222 adds "1" to the count value C (Step S811). The CPU 222 determines whether or not all the printing processes instructed by the print job have ended (Step S812). In a case where all the printing processes have ended ("Y" in Step S812), the CPU 222 ends the processing. When not all of the printing processes have ended ("N" in Step S812), the CPU 222 determines whether or not the count value C exceeds the set value of the number of sheets of the adjustment interval set on the adjustment interval setting screen of FIG. 7D (Step S813).

In a case where the count value C does not exceed the set value ("N" in Step S813), the CPU 222 repeatedly performs Step S808 and the subsequent processing steps. In a case where the count value C exceeds the set value ("Y" in Step S813), the CPU 222 performs the image density correction determining processing, which is described later (Step S814). After the image density correction determining processing, the CPU 222 repeatedly performs Step S807 and the subsequent processing steps.

As described above, the CPU 222 determines the target tone when the predetermined-interval mode is set, and prints an image on recording media in accordance with a print job while correcting an image density each time the count value C exceeds the set value. After the end of the image formation on the number of sheets of recording media as instructed by the print job, the CPU 222 ends the processing corresponding to the print job. Even when an error occurs in the target tone determining processing of Step S806 or the image density correction determining processing of Step S814, the CPU 222 ends the processing corresponding to the print job.

FIG. 9 is a flow chart for illustrating the target tone determining processing of Step S806.

The CPU 222 examines, based on a print job obtained from the external controller 102, a type of recording media being used for the print job and an image forming mode (duplex printing or single-sided printing) (Step S901). The CPU 222 conveys one of the recording media being used for the print job, and creates a chart for adjustment (Step S902). In a case of the single-sided printing, the CPU 222 creates a chart for adjustment by forming the patterns 501 for adjustment for tone correction on one side of the recording medium. In a case of the duplex printing, the CPU 222 creates a chart for adjustment by forming the patterns 501 for adjustment for tone correction on both sides of the recording medium. The CPU 222 reads the created chart for adjustment by the CISs 321 and 322 (Step S903). The CPU 222 determines success or failure of the reading processing based on a reading result of the patterns 501 for adjustment which has been obtained by each of the CISs 321 and 322 (Step S904). For example, the CPU 222 determines that the reading processing has failed in a case where the reading result includes an abnormal value.

In a case where the reading processing is successful ("Y" in Step S904), the CPU 222 determines the target tone serving as the target value based on the reading result of the patterns 501 for adjustment which has been obtained by each of the CISs 321 and 322 (Step S905). The CPU 222, which has determined the target tone, ends the target tone determining processing, and the process advances to the processing step of Step S807.

In a case where the reading processing fails ("N" in Step S904), the CPU 222 adds "1" to the reading failure count (Step S906). The CPU 222 determines whether or not the reading failure count is the predetermined number or more. In this embodiment, the CPU 222 determines whether or not the reading failure count is "5" or more (Step S907). In a case where the reading failure count is smaller than "5" ("N" in Step S907), the process returns to the processing step of Step S902, and the CPU 222 creates a chart for adjustment again to attempt to determine the target tone. In a case where the reading failure count is "5" or more ("Y" in Step S907), the CPU 222 determines that there is a possibility that a failure has occurred in the CIS 321 or the CIS 322. Therefore, the CPU 222 stops the operation due to an error (Step S908), and ends the print job.

As described above, in the target tone determining processing, in a case where the reading of the patterns 501 for adjustment fails, a chart for adjustment is repeatedly created and read until it is determined that there is a possibility that a failure has occurred in the CIS 321 or the CIS 322. In a case where the target tone is determined while a chart for adjustment is created and read a predetermined number of times, the image formation corresponding to the print job keeps being performed as it is. In a case where the reading of the patterns 501 for adjustment has failed a predetermined number of times in a row, the print job ends due to an error. Once the target tone is determined, the image quality is maintained from the beginning of the print job.

FIG. 10 is a flow chart for illustrating the image density correction determining processing of Step S814.

The CPU 222 conveys one of the recording media being used for the print job, and creates a chart for adjustment by forming the patterns 501 for adjustment for tone correction on this recording medium (Step S1001). The CPU 222 reads the formed chart for adjustment by each of the CISs 321 and 322 (Step S1002). The CPU 222 determines the success or failure of the reading processing based on the reading result of the patterns 501 for adjustment which has been obtained by each of the CISs 321 and 322 (Step S1003). For example, the CPU 222 determines that the reading processing has failed in a case where the reading result includes an abnormal value. In a case where the CIS 321 reads the chart for adjustment, the CPU 222 determines that the reading processing has failed in a case where a brightness value of the read image relating to the chart for adjustment which has been output from the CIS 321 falls out of an allowable range. In the same manner, in a case where the CIS 322 reads the chart for adjustment, the CPU 222 determines that the reading processing has failed in a case where a brightness value of the read image relating to the chart for adjustment which has been output from the CIS 322 falls out of the allowable range.

In a case where the reading processing is successful ("Y" in Step S1003), the CPU 222 compares the reading result of the patterns 501 for adjustment which has been obtained by each of the CISs 321 and 322 and the target tone to each other to determine the correction characteristics of the image density (Step S1004). The CPU 222 further sets the image density correction flag to ON (Step S1005). The CPU 222, which has set the image density correction flag to ON, ends the image density correction determining processing, and the process advances to the processing step of Step S807.

In a case where the reading processing fails ("N" in Step S1003), the CPU 222 adds "1" to the reading failure count (Step S1006). The CPU 222 determines whether or not the reading failure count is the predetermined number or more. In this embodiment, the CPU 222 determines whether or not the reading failure count is "5" or more (Step S1007). Once the print job is started, the reading failure count does not become "0" except that the reading failure count is cleared in the processing step of Step S805. Thus, at the stage of the processing step of Step S1007, the reading failure count is obtained by adding "1" to the number of times that the reading has failed in the target tone determining processing. That is, it is determined in the processing step of Step S1007 whether or not a total reading failure count since the start of the print job is the predetermined number or more.

In a case where the reading failure count is smaller than "5" ("N" in Step S1007), the CPU 222 ends the image density correction determining processing, and the process advances to the processing step of Step S807. In a case where the reading failure count is "5" or more ("Y" in Step S1007), the CPU 222 determines that there is a possibility that a failure has occurred in the CIS 321 or the CIS 322. Therefore, the CPU 222 stops the operation due to an error (Step S1008), and ends the print job.

As described above, in the image density correction determining processing, even when the reading of the patterns 501 for adjustment has failed, the reading of the patterns 501 for adjustment is not repeatedly performed. Thus, productivity is prevented from decreasing by the image density correction determining processing. In a case where the operation is stopped due to an error in the target tone determining processing and the image density correction determining processing, the CPU 222 notifies the user that the job has been stopped due to an error through use of the display 225. The CPU 222 thus prompts the user to handle the situation.

In the image forming apparatus 101 according to this embodiment, the target tone is determined at the start of a print job, and the image forming conditions are adjusted even when an image is continuously formed by the print job. With the setting of the target tone performed at the start of a print job, even in the case of a print job for performing printing continuously, the image quality is maintained from an image formed on the first recording medium, to thereby guarantee stability in color tint. Further, in the image density correction determining processing during the print job, the processing is not repeatedly performed, and hence the productivity is guaranteed. As the processing in this embodiment, it is possible to employ any processing that maintains the image quality by reading an image for adjustment formed on a recording medium and adjusting the image forming conditions based on the reading result of the image for adjustment. The effects of this embodiment can also be obtained in the same manner for such processing. As described above, according to the embodiment of the present disclosure, it is possible to maintain the image quality while suppressing a decrease in productivity.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-089870, filed May 28, 2021, which is hereby incorporated by reference herein in its entirety.

What is claimed is:

1. An image forming apparatus comprising:
    an image forming unit configured to form an image on a recording medium based on an image forming condition;
    an image reader configured to read an image for adjustment of the image forming condition, the image for adjustment being formed on the recording medium; and
    a controller configured to:
        control the image forming unit to form images for adjustment;
        control the image reader to read the images for adjustment;
        determine target data based on a reading result of a first image included in reading results of the images for adjustment;
        adjust the image forming condition, during execution of a job in which the image forming unit forms a plurality of images on a plurality of recording mediums, based on the target data and a reading result of a second image included in the reading results of the images for adjustment;
        control the image forming unit to form the first image again during execution of the job, in a case where the image reader fails to read the first image during execution of the job; and
        avoid adjusting the image forming condition based on the reading result of the second image during execution of the job, in a case where the image reader fails to read the second image during execution of the job.

2. The image forming apparatus according to claim 1, wherein the controller is configured to control the image forming unit to form the first image before the second image is to be formed.

3. The image forming apparatus according to claim 1, wherein the controller is configured to control the image forming unit to form the second image each time the image forming unit ends forming an image on a predetermined number of sheets of recording media.

4. The image forming apparatus according to claim 1, wherein the controller is configured to determine that a possibility that a failure has occurred in the image reader exists in a case where the image reader fails to read the first image a predetermined number of times.

5. The image forming apparatus according to claim 4, wherein the controller is configured to end the job when it has been determined that the possibility that a failure has occurred in the image reader exists.

6. The image forming apparatus according to claim 4, wherein the controller is configured to notify that the job has been stopped due to an error when it has been determined that the possibility that a failure has occurred in the image reader exists.

7. The image forming apparatus according to claim 1, wherein the controller is configured to determine that a possibility that a failure has occurred in the image reader exists in a case where a number of times the image reader fails to read the second image is equal to or greater than a predetermined number of times.

* * * * *